March 11, 1941.   E. C. SMITH   2,234,658

METHOD OF CUTTING OR PREPARING FISH

Filed June 15, 1940

Inventor
Evelyn C. Smith
By
Attorneys

Patented Mar. 11, 1941

2,234,658

UNITED STATES PATENT OFFICE 2,234,658

METHOD OF CUTTING OR PREPARING FISH

Evelyn C. Smith, Port Washington, Wis., assignor to Smith Bros. of Port Washington, Inc., Port Washington, Wis., Application June 15, 1940, Serial No. 340,748

4 Claims. (Cl. 17—45)

This invention pertains to the art of preparing fish for individual consumption, and more particularly to a novel form of steak and the method of constructing the same, whereby the individual cooked portions are highly appetizing and palatable.

The trade, and particularly restaurants, generally prefer medium sized fish (say, from 4 to 8 lbs.), which can be advantageously cut into fillets and served in an appetizing manner on the table. The smaller sized fish are in great demand for home use. Consequently, fish weighing from 1½ lbs. to 8 lbs. command the best price, while larger fish (over 8 lbs.) command a lower price per pound.

For marketing convenience, fish, such as lake trout, pike, salmon, cod, etc., fall into three divisions, namely, small, medium, and large size; and, for example, lake trout may be quoted on as follows:

| | Cents per pound |
|---|---|
| Small (individual) 1½–4 lbs | 27 |
| Medium (for filleting) 4–8 lbs | 27 |
| Large, all over 8 lbs | 23 |

Therefore, it is customary for commercial fishermen to merely dress the No. 1 small sized fish; to fillet the No. 2 medium sized fish; and to either smoke the large sized fish, or furnish them to the trade intact.

It is, therefore, one of the primary objects of my invention to provide a novel method of preparing fish, particularly large and medium fish, whereby a great number of attractive portions of advantageous size and appearance can be had for supplying the trade, and whereby large fish will command as good, or better prices than the small or medium sized fish.

In broiling fillets from medium sized fish, the skin side is usually placed downwardly on the grill, with the meat side facing the flame. The heat dissolves the fatty particles, which work down through the meat fibres, and as the fatty particles cannot escape through the skin, the cooked fillet is too rich and not so palatable as might be desired. A fatty fish, therefore, and usually the large fish are fatty, cannot be used successfully under ordinary handling methods, because of the great amount of richness remaining in the portion next to the skin after the fish has been cooked.

Therefore, another salient object of my invention resides in the method of cutting fish into steaks of a desired size for cooking, with no skin present on the exposed surface of the meat to retain the oily substance in the fish, whereby the steaks, particularly those from large sized fish, can be broiled or otherwise cooked, having a much sought-for, delicate flavor.

With the above and other objects in view, which will appear as the description proceeds, the invention resides in the novel method, construction, and arrangement of parts, substantially as hereinafter described, and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

Figure 1:
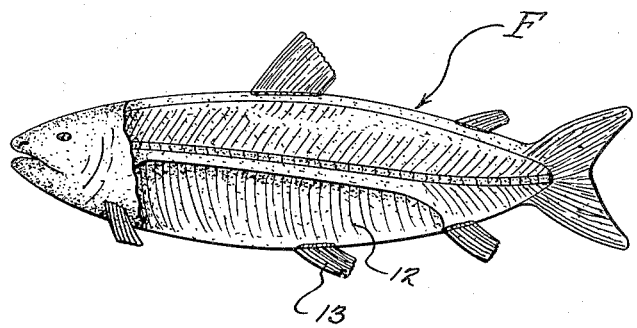
Figure 1 is a side elevational view, showing an eviscerated fish with its top side cut away.
Figure 2:
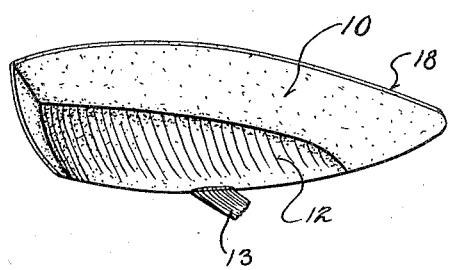
Figure 2 is a side elevational view, showing a slab cut away from the bottom side of the fish, with the inner face exposed.
Figure 3:
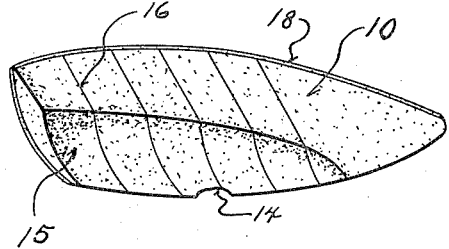
Figure 3 is a view similar to Figure 2, but showing the rib bones scraped away, and the pelvic fin cut out, leaving a clean fillet, with the fillet cut into transverse slices.

Referring to the drawing in detail, wherein similar reference characters designate corresponding parts throughout the several views, the letter F generally indicates a fish, in the present instance a lake trout, and, in accordance with my method, the fish is first cleaned in the ordinary way, by slitting the belly with a sharp knife from the anal fin to the neckbone. The fish is then cut transversely immediately back of the neckbone and pectoral fin down to the backbone. The knife is then turned horizontally, and the fish is cut longitudinally along the backbone to the caudal fin. This provides a slab 10, and the operation is then repeated on the opposite side to produce a corresponding slab. Each slab is then laid with the skin down, and the rib bones 12 are scraped away, and the pelvic fin 13 is cut out, as at 14. This is clearly illustrated in Figure 3, and provides a large, clean fillet.

Figure 4:
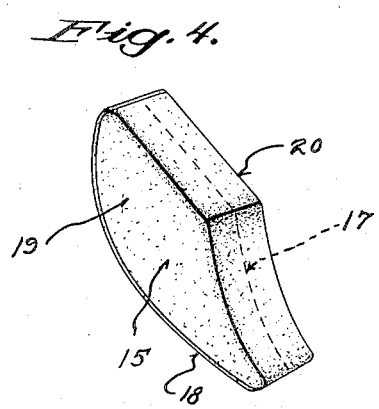
Figure 4 is an enlarged, detail, perspective view showing one of the relatively thick slices cut from the fillet, marked with a dotted line to illustrate a further cut to be made.

The fillet is then cut in relatively thick slices 15 along transverse lines 16. The slices 15 are then each cut centrally along the dotted lines 17 shown in Figure 4, down to the skin 18, and the divided portions 19 and 20 are then parted and laid in a horizontal plane with the skin 18 connecting the portions and serving as a hinge. This provides a fish steak of desired size and attractive shape for individual service, with no skin present on any of the exposed faces of meat.

Figure 5:
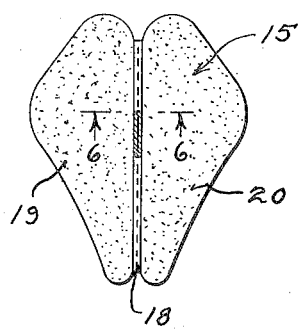
Figure 5 is a top plan view, showing the slices with the further cut made and the slice spread open with the skin acting as a hinge, to form an attractive appearing steak of a desired size.
Figure 6:
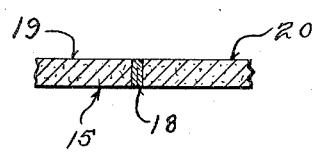
Figure 6 is an enlarged, fragmentary, detailed, sectional view through the fish steak, taken on the line 6—6 of Figure 5, looking in the direction of the arrows, illustrating the skin of the fish forming a hinge.

During the cooking operation of a fashioned steak as shown in Figure 5, the abutting surfaces of the skin 18 will usually sear themselves together to form a bind, and prevent opening or parting of the divided portions 19 and 20.

On the other hand, the skin of certain fish may not adhere through the action of heat incidental to cooking, in which event it is proposed to use some form of binder between the abutting surfaces of skin, such as the white of an egg, an edible flour adhesive, and the like.

My method has many advantages. Not only can large fish be conveniently used in the trade, and command a high price, but the individual portions of the fish can be cooked in a tasteful manner with a delightful, delicate flavor, superior to smaller fish cooked by conventional methods. In cooking the individual fish portions, as the heat melts the fatty substance of the fish, the same is permitted to readily escape through the meat parts of the fish, inasmuch as the fatty substance is not retained in the meaty parts by fish skin, but permitted to drain off.

From the foregoing description, it will be apparent that I have provided a simple and novel portion of fish and method for preparing and serving the same attractively, with a highly delicate flavor.

While the present invention is particularly applicable to large fish, which heretofore have brought relatively lower prices on the market, it may also be advantageously used in connection with medium sized fish, in that steaks formed in the manner described permit fatty substances to readily drain from the meat, thus resulting in a more palatable serving.

The present method enhances the value of leaner fish, in that it permits thicker slices to be utilized, which retain their flavor to a greater extent than thinner slices.

While the foregoing explanation makes no reference to scale fish, it is to be understood that when the same are used, naturally the scales will be removed in the course of preparing the fish.

Changes and details may be made without departing from the spirit or scope of my invention, but what I claim as new is:

1. An individual, boneless portion of fish consisting in, a single slice parted into corresponding sections positioned in the same plane and connected by skin on their adjacent edges, said skin being coated with an edible binder and folded upon itself.

2. A method of preparing fish to provide individual service portions consisting in, first, removing the fillets, next, cutting the fillets transversely into slices, then, dividing the slices to a point adjacent one of their edges, and then, parting the divided portions and folding the same to abut a portion of their edges, leaving the portions supported in the same plane.

3. A method of preparing fish to provide individual service portions consisting in, first, removing the fillets with the skin attached, next, cutting the fillets transversely into slices, then, dividing the slices without severing the skin, and then, parting the divided portions and folding the skin upon itself to leave all exposed surfaces of the meat free of skin.

4. A method of preparing fish to provide individual service portions consisting in, first, removing the fillets with the skin attached, next, cutting the fillets transversely into slices, then, dividing the slices without severing the skin, then, coating the skin with an edible binder, and lastly, parting the divided portions and folding the skin upon itself to leave all exposed surfaces of the meat free of skin.

EVELYN C. SMITH.